United States Patent [19]

Imahashi

[11] 4,040,672
[45] Aug. 9, 1977

[54] CENTER CAP FOR A WHEEL

[76] Inventor: Shigeyuki Imahashi, No. 27-47 Takanawa-1 Chome, Minato, Tokyo, Japan, 108

[21] Appl. No.: 606,948

[22] Filed: Aug. 22, 1975

[51] Int. Cl.² .............................................. B60B 7/06
[52] U.S. Cl. ........................... 301/108 A; 301/108 S; 220/233; 220/235; 220/307; 220/327
[58] Field of Search .......... 301/108 R, 108 A, 108 S, 301/108 SL, 37 R, 37 AT, 37 N, 37 TP, 37 PB, 37 B; 220/307, 327, 233, 235

[56] References Cited

U.S. PATENT DOCUMENTS

| 681,666 | 8/1901 | Call | 301/108 R |
|---|---|---|---|
| 1,875,906 | 9/1932 | Zarobsky | 301/108 R X |
| 2,070,579 | 2/1937 | Brooke | 220/235 |
| 2,101,030 | 12/1937 | Kunze | 220/235 |
| 2,108,145 | 2/1938 | Short | 301/37 AT |
| 3,724,906 | 4/1973 | McCarroll | 301/37 R |
| 3,731,978 | 5/1973 | Davis | 301/108 SC |

FOREIGN PATENT DOCUMENTS

| 270,248 | 12/1929 | Italy | 301/108 R |
|---|---|---|---|
| 535,375 | 4/1941 | United Kingdom | 220/307 |

Primary Examiner—Robert B. Reeves
Assistant Examiner—Charles A. Marmor
Attorney, Agent, or Firm—Fleit & Jacobson

[57] ABSTRACT

Center cap for the hub of a wheel which is characterized by the provision of elastically deformable joint ratchets at the open end of a cylindrical cap body, the joint ratchets provided with a groove on their outer periphery which receives an annular protruding part of the wheel hub and the joint ratchets having a gradually bevelled surface inclining inwards from the groove on the top of the ratchets and the inside of the cap body is provided with a restrict member to restrict elastic deformation of the ratchets in a radial direction.

3 Claims, 10 Drawing Figures

CENTER CAP FOR A WHEEL

BACKGROUND OF THE INVENTION

The invention is concerned with the center cap for the center of the wheel of a vehicle such as a motor car.

The center cap of the prior art was fitted to the wheel from outside of the wheel utilizing the elasticity of the cap in a radial direction and there was the possibility of it being removed from the moving car by vibration and was in danger of being stolen by the center cap maniac.

The first object of this invention is to provide an improved center cap which is not removed from the moving wheel by vibration.

The second object of the invention is to provide an improved center cap which can not be removed easily without a tool.

The third object of the invention is to provide an improved center cap which can not be removed unless it is operated from inside of the wheel.

BRIEF DESCRIPTION OF THE DRAWINGS

Other features and advantages of the invention will be apparent from the following description taken in connection with the accompanying drawings wherein.

DETAILED DESCRIPTION

Figure 1:
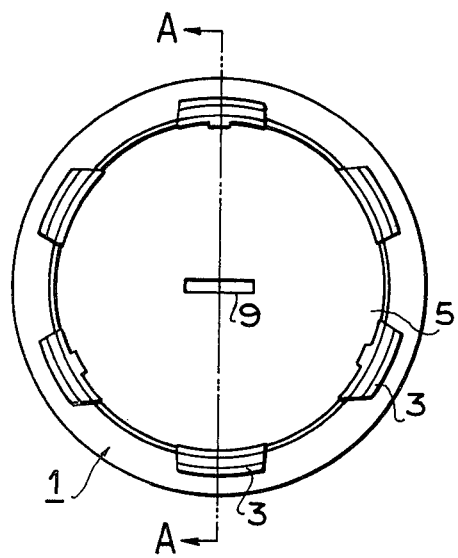
FIG. 1 is an end view of an embodiment of the invention.
Figure 2A:
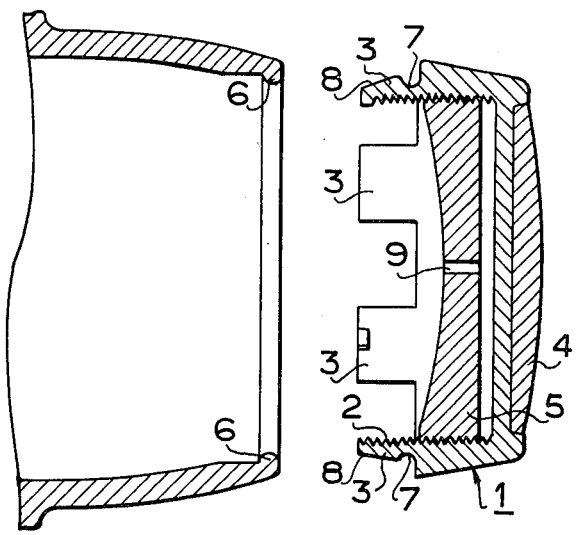
FIGS. 2a – 2c are longitudinal sectional side views of FIG. 1 taken along line A-A at various stages of assembly.
Figure 2B:
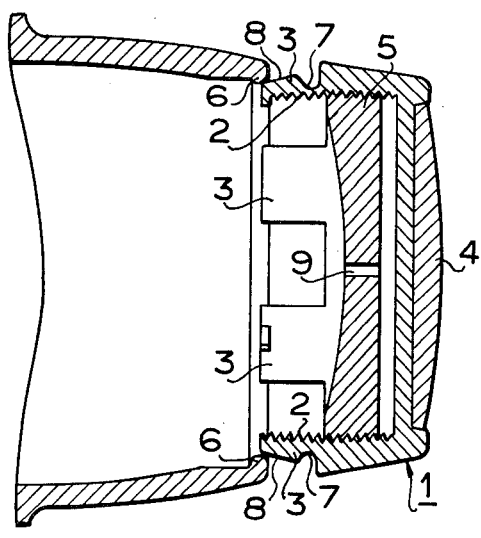
Figure 2C:
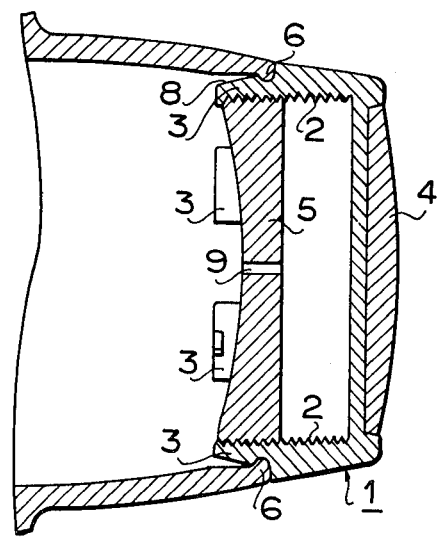
Figure 3:
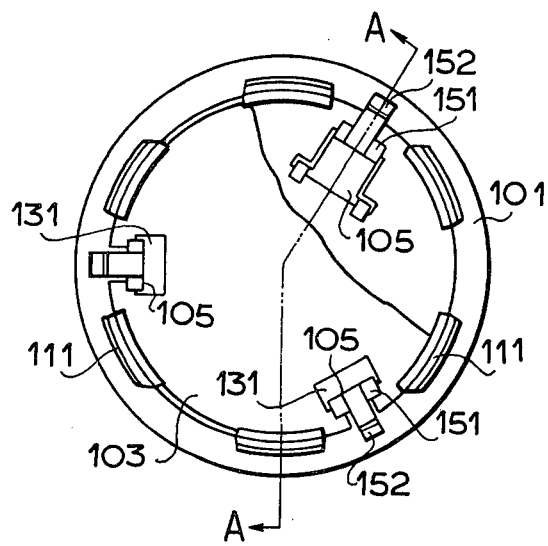
FIG. 3 is an end view of another embodiment of the invention.
Figure 4A:
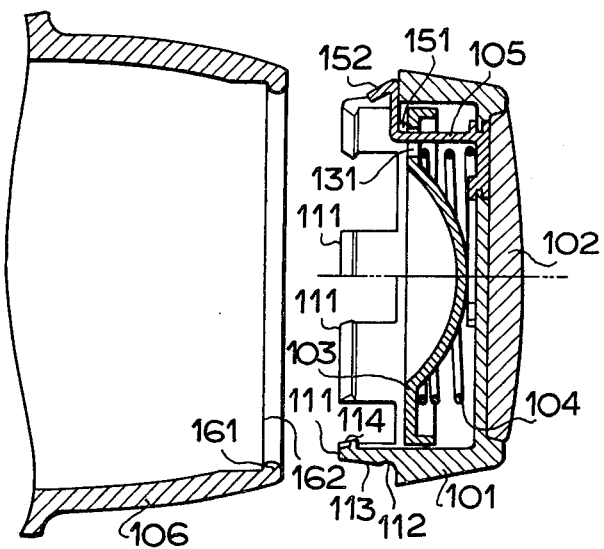
FIGS. 4a – 4c are longitudinal and sectional side views of FIG. 3 taken along line A-A at various stages of assembly.
Figure 4B:
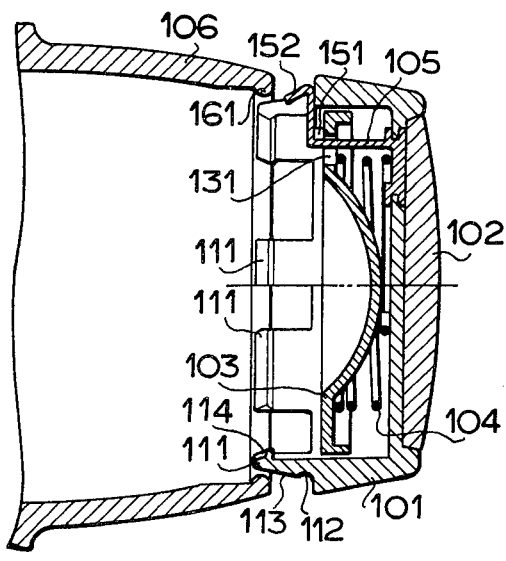
Figure 4C:
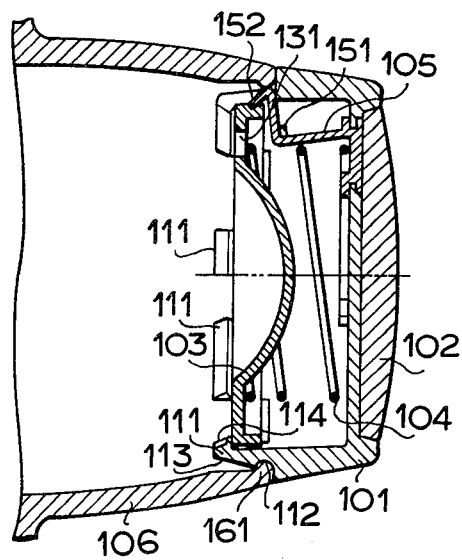

Referring to FIG. 1 and FIGS. 2a – 2c inclusive of the drawings, 1 is the cylindrical cap body and its inner circumferential surface is provided with a spiral guide groove 2. A plurality of joint ratchets 3 are formed on the edge of the open end of the cap body 1 at equal intervals and an ornament 4 is fitted on the other end of the cap body 1 when it is necessary. A restrict member 5 which is able to be screwed freely in said spiral guide groove 2, is arranged inside of said cap body 1. The joint ratchets 3 are formed on the cap body 1 and each of the ratchets is provided with a peripheral joint groove 7 respectively which receives an annular protruding part 6 formed on the inside of the edge of the central part of the wheel. Each of the ratchets has an inclined peripheral surface 8 beveled inwards from one end adjacent the joint groove 7 to the other free end.

The diameter defined by the free ends of the inclined surface 8 is smaller than the inner diameter of said annular protruding part 6.

The cap body 1 may be made preferably from thin metal plate or synthetic resin such as ABS resin the joint ratchets 3 are arranged so that allowance can be taken of the elastic deformation occuring in a radial direction.

Referring to the drawings, numeral 9 is a slit formed in the restrict member 5 for inserting a screw driver.

In the center cap constituted as described above, the joint ratchets 3 of the cap body 1 are connected to the annular protruding part 6 by pressing the cap body so as to insert the joint ratchets into the fitting hole of the wheel. Then, the joint ratchets 3 are compressed and deformed by the inner diameter of the annular protruding part 6 guided by the inclined surface 8 and are restored to the original state by their elasticity and fixed temporarily when the protruding part 6 and joint groove 7 are connected together.

In this condition, when the restrict member 5 is revolved by the screw driver inserted into the slit 9, it is screwed up to the position of the joint ratchets 3 and the latter are prevented from compression and deformation. Therefore, the center cap cannot be removed from the moving wheel by the vibration because the joint ratchets 3 are not subjected to elastic deformation.

The restrict member can be moved only by operating it from the back of the cap so the cap can not be removed outside of the cap features useful for protecting the cap from theft.

Referring to the embodiment of the invention shown in FIG. 3 and FIGS. 4a – 4c inclusive, the center cap has the structure which acts to automatically set the restrict member.

Numeral 101 is a cylindrical body as in the embodiment described above and a plurality of joint ratchets 111 are formed at equal intervals on the edge of the cylindrical body and an ornament 102 is fitted on the other side of the cylindrical body when it is necessary. The joint ratchets 111 are formed on the cylindrical body 101 and the outside peripheral surface of the ratchets is provided with a groove 112 which receives an annular protruding part 161 which is formed on the inside of the free edge of the wheel member 106. The joint ratchets 111 are provided with an inclined surface 113 which is beveled inwards from the one end adjacent the groove 112 to the other free end of the joint ratchet 111.

Therefore, when the body 101 is compressed as the joint ratchets 111 are inserted into the fitting hole 162 of the wheel member 106, the joint ratchets 111 are elastically deformed inwards as the inclined surface 113 contacts the protruding part 161 of the wheel member 106 and are restored to their original state when the grooves 112 receives the protruding part 161 thereby functioning to fix the body 101 to the hub of the wheel.

A circular restrict member 103 is arranged for axial movement in the body 101. The restrict member 103 is brought into contact with the inner surface of the joint ratchets 111 by the action of a spring 104 provided between the body 101 and the restrict member 103 and prevents the joint ratchet 111 from inward deformation.

The body 101 has a plurality of joint members 105 made from moderately elastic material and arranged at equal intervals along the inner circumference of body 1. The joint members 105 have a part 151 which protrudes forwardly through a hole 131 in the restrict member 103 and is disposed adjacent the front face of the restrict member 103 so as to hold the latter at its position when it is moved against the spring 104. The joint members 105 have a contact part 152 which protrudes in the annular space surrounding the groove 112 of the joint ratchets 111.

When the body 101 is fixed to a wheel member 106, the restrict member 103 is set at a connected position with the joint member 105.

In the center cap constituted as described above, the protruding part 161 is received within the groove 112 when the body 101 is fitted to the wheel member 106, and the protruding part 161 contacts the beveled contact part 152 so that the joint member 151 is deformed inwards. By this deformation, the joint member 151 is displaced to the position removed from the front surface of the restrict member 103 and the latter moves by the action of the spring 104.

After this condition is reached, the circumferential surface of the restrict member 103 is positioned inside of the joint ratchets 111 which are prevented by the restrict member 103 from deforming inwards, and the center cap is prevented from being removed off the moving wheel by vibration.

Figure 5:
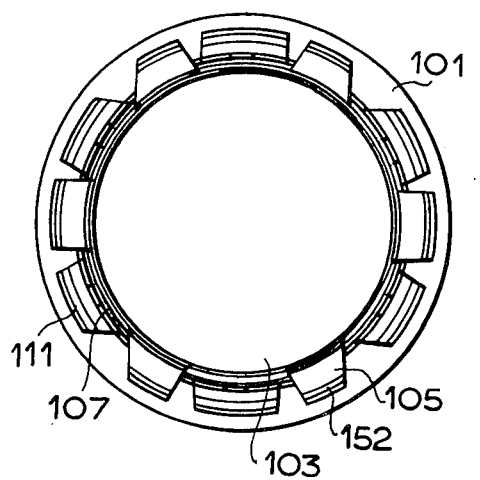
FIG. 5 is an end view of a modified form of the embodiment shown in FIG. 3.
Figure 6:
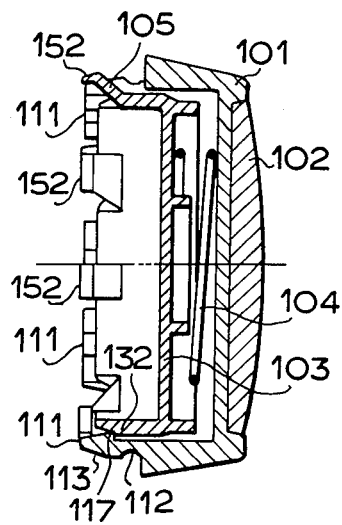
FIG. 6 is a longitudinal and sectional side view of the embodiment of FIG. 5.

FIG. 5 and FIG. 6 illustrate a modified embodiment of second embodiment described above wherein the restrict member 103 is formed in a body with the joint member 105 as that when the contact part 152 of the joint member 105 is compressed by the protruding part 161 in the wheel member 106 to cause inward deformation of the radial direction and fixing of the center cap to the wheel member.

The amount of the protrusion of the restrict member 103 by the spring 104 is restricted when an end 132 of the restrict member 103 is held by a step part 117 formed inside of the joint ratchets 111 of the body 101.

In this construction, when the body 101 is inserted in the wheel member 106, the protruding part 161 presses the contact part 152 inwards and the restrict member 103 is pressed inwards against the spring 104. By this procedure, the protruding part 161 is inserted in the groove 112 and the center cap is fixed to the wheel member 106. At this condition, the joint ratchets 111 move to the original position and the joint member 105 is freed from the protruding part 161 so that restrict member 103 is restored to the position in back of the joint ratchets 111 by the spring 104, and the ratchets 111 are prevented from inward deformation in a radial direction. Therefore, the center cap is prevented from being removed from the wheel member 106.

In the second and the third examples, the cap is removed when the restrict member 103 is pushed against the spring from the inside of the wheel and the protruding part 161 is detached from the groove 112 by deforming the joint ratchets 111 inwards.

What I claim is:

1. A center cap for a wheel hub having an open end and an inwardly directed annular protruding part on the edge of the hub open end comprising, in combination, a cylindrical cap body having an open end, a plurality of circumferentially spaced, elastically deformable joint ratchets on the open end edge of said body, the outer periphery of said body having an annular groove adjacent the inner end of said joint ratchets for receiving said protruding part in the assembled position of said cap on said wheel hub and the outer periphery of said joint ratchets having a beveled surface extending inwardly from said groove to the free end of said ratchets for sliding engagement with said protruding part and an axially movable restrict member means within said cap body for moving between an inoperative position remote from said joint ratchets and an operative position in underlying concentric relationship with said joint ratchets for preventing elastic deformation of said joint ratchets in an inwardly radial direction, said restrict member means comprising a circular member wherein the outer periphery of said circular member is provided with threads for engagement with a spiral guide groove formed in the inner surface of said cap body to permit said axial movement of said circular member and including a slit disposed centrally in said circular member accessible to a driving device from the inside of said wheel hub for moving said circular member axially between its operative and inoperative positions.

2. A center cap for a wheel hub having an open end and an inwardly directed annular protruding part on the edge of the hub open end comprising, in combination, a cylindrical cap body having an open end, a plurality of circumferentially spaced, elastically deformable joint ratchets on the open end edge of said body, the outer periphery of said body having an annular groove adjacent the inner end of said joint ratchets for receiving said protruding part in the assembled position of said cap on said wheel hub and the outer periphery of said joint ratchets having a beveled surface extending inwardly from said groove to the free end of said ratchets for sliding engagement with said protruding part and an axially movable restrict member means within said cap body for moving between an inoperative position remote from said joint ratchets and an operative position in underlying concentric relationship with said joint ratchets for preventing elastic deformation of said joint ratchets in an inwardly radial direction, said restrict member means comprising a circular member, a spring disposed in the interior of said cap body for yieldingly urging said circular member from its inoperative position into said operative position, a joint member means disposed in the interior of said cap body for yieldingly retaining said restrict member in said inoperative position, said joint member means comprising an elastic member connected at one end to said cap body and its other end being engageable by said annular protruding part during the assembly of said cap body on said wheel hub for releasing said circular member and permitting said axial movement of said circular member into said operative position.

3. A center cap for a wheel hub having an open end and an inwardly directed annular protruding part on the edge of the hub open end comprising, in combination, a cylindrical cap body having an open end, a plurality of circumferentially spaced, elastically deformable joint ratchets on the open end edge of said body, the outer periphery of said body having an annular groove adjacent the inner end of said joint ratchets for receiving said protruding part in the assembled position of said cap on said wheel hub and the outer periphery of said joint ratchets having a beveled surface extending inwardly from said groove to the free end of said ratchets for sliding engagement with said protruding part and an axially movable restrict member means within said cap body for moving between an inoperative position remote from said joint ratchets and an operative position in underlying concentric relationship with said joint ratchets for preventing elastic deformation of said joint ratchets in an inwardly radial direction, said restrict member means comprising a circular member, a spring disposed in the interior of said cap body for yieldingly urging said circular member from its inoperative position into said operative position, retaining means on the inner surface of said cap body for retaining said circular member, said retaining means comprising a lip adjacent the open end of said cap body and wherein said circular member is provided with a yieldable joint member means for engagement by said annular protruding part during the assembly of said cap body on said wheel hub to permit said circular member to be moved into said operative position by said spring during the assembly of said center cap on said wheel hub, said yieldable joint member comprising a deformable contact arm extending from said circular member toward the open end of said cap body wherein said circular member stresses said spring during the assembly of said center cap on said wheel hub by movement of said deformable contact arm by said protruding part and to permit said circular member to return to an unstressed condition when said protruding part is received within said annular groove.

* * * * *